(12) United States Patent
Gourraud

(10) Patent No.: US 12,017,425 B2
(45) Date of Patent: Jun. 25, 2024

(54) METHOD AND MANUFACTURING SYSTEM FOR MANUFACTURING AN OPHTHALMIC LENS USING AN ADDITIVE MANUFACTURING TECHNOLOGY

(71) Applicant: ESSILOR INTERNATIONAL, Charenton-le-Pont (FR)

(72) Inventor: Alexandre Gourraud, Charenton le Pont (FR)

(73) Assignee: Essilor International, Charenton-le-pont (FR)

( * ) Notice: Subject to any disclaimer, the term of this patent is extended or adjusted under 35 U.S.C. 154(b) by 534 days.

(21) Appl. No.: 17/279,994

(22) PCT Filed: Sep. 24, 2019

(86) PCT No.: PCT/EP2019/075707
§ 371 (c)(1),
(2) Date: Mar. 25, 2021

(87) PCT Pub. No.: WO2020/064728
PCT Pub. Date: Apr. 2, 2020

(65) Prior Publication Data
US 2021/0394472 A1    Dec. 23, 2021

(30) Foreign Application Priority Data

Sep. 25, 2018    (EP) .................................... 18306240

(51) Int. Cl.
*B29D 11/00* (2006.01)
*B29C 64/386* (2017.01)
(Continued)

(52) U.S. Cl.
CPC ...... *B29D 11/00432* (2013.01); *B29C 64/386* (2017.08); *B33Y 10/00* (2014.12);
(Continued)

(58) Field of Classification Search
CPC ................................................. B29D 11/00009
See application file for complete search history.

(56) References Cited

U.S. PATENT DOCUMENTS

2011/0257930 A1    10/2011 Gourraud
2015/0241714 A1*   8/2015 Allione ............ B29D 11/0073
                                            351/159.73
(Continued)

FOREIGN PATENT DOCUMENTS

| CN | 108139603 A |  | 6/2018 |  |
|----|-------------|--|--------|--|
| EP | 3 266 067   |  | 10/2017 |  |
| EP | 3226067 B1  | * | 12/2018 | ............. B24B 13/00 |

OTHER PUBLICATIONS

Office Action issued in Chinese Patent Application No. 201980062329.1 dated Mar. 25, 2022.
(Continued)

*Primary Examiner* — Nahida Sultana
*Assistant Examiner* — Virak Nguon
(74) *Attorney, Agent, or Firm* — NIXON & VANDERHYE

(57) ABSTRACT

A method for manufacturing an ophthalmic lens using an additive manufacturing technology, based on an optical element and initial manufacturing data, the initial manufacturing data including data defining a complementary portion to deposit on the optical element to form the ophthalmic lens from the optical element, includes the steps of: positioning the optical element on a support; determining a positioning error between the position of the optical element and a reference position on the support using a measurement directed to the optical element; determining a deterioration on the optical element; calculating updated manufacturing data taking into account initial manufacturing data and the determined positioning error; and manufacturing the ophthalmic lens using the updated manufacturing data by the (Continued)

additive manufacturing technology by depositing the complementary portion on the optical element to form the ophthalmic lens from the optical element. A manufacturing system for manufacturing an ophthalmic lens is also described.

19 Claims, 1 Drawing Sheet

(51) Int. Cl.
 *B29L 11/00* (2006.01)
 *B33Y 10/00* (2015.01)
 *B33Y 50/00* (2015.01)
 *B33Y 80/00* (2015.01)
(52) U.S. Cl.
 CPC ............... *B33Y 50/00* (2014.12); *B33Y 80/00* (2014.12); *B29L 2011/0016* (2013.01)

(56) References Cited

U.S. PATENT DOCUMENTS

| | | |
|---|---|---|
| 2016/0001414 A1 | 1/2016 | Dubois et al. |
| 2016/0046090 A1 | 2/2016 | Allione et al. |
| 2016/0161761 A1* | 6/2016 | Quere .................... G02C 7/027 |
| | | 427/164 |
| 2016/0185056 A1 | 6/2016 | Beacham et al. |
| 2018/0162055 A1* | 6/2018 | Biskop ............... B29D 11/0098 |
| 2018/0299696 A1 | 10/2018 | Heslouis et al. |
| 2020/0230775 A1 | 7/2020 | Rego et al. |

OTHER PUBLICATIONS

International Search Report and Written Opinion of the ISA for PCT/EP2019/075707 dated Nov. 26, 2019, 14 pages.

* cited by examiner

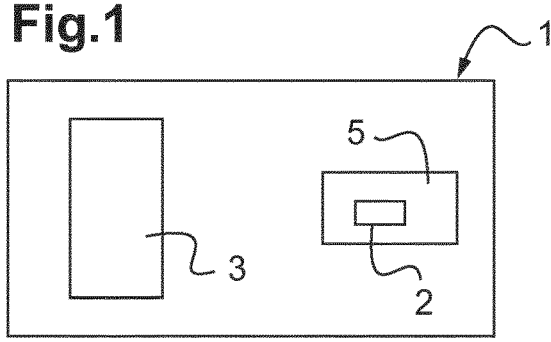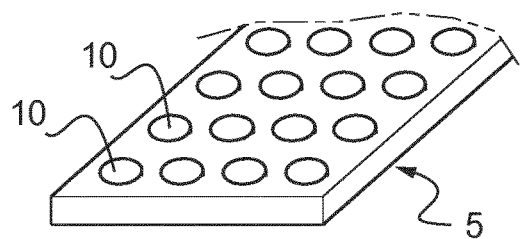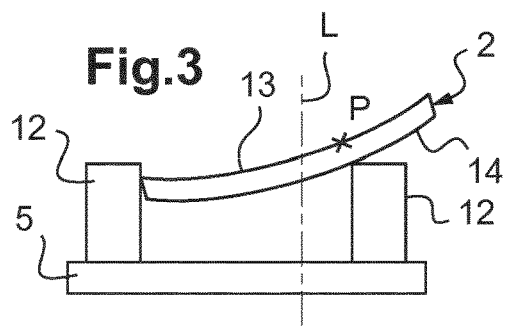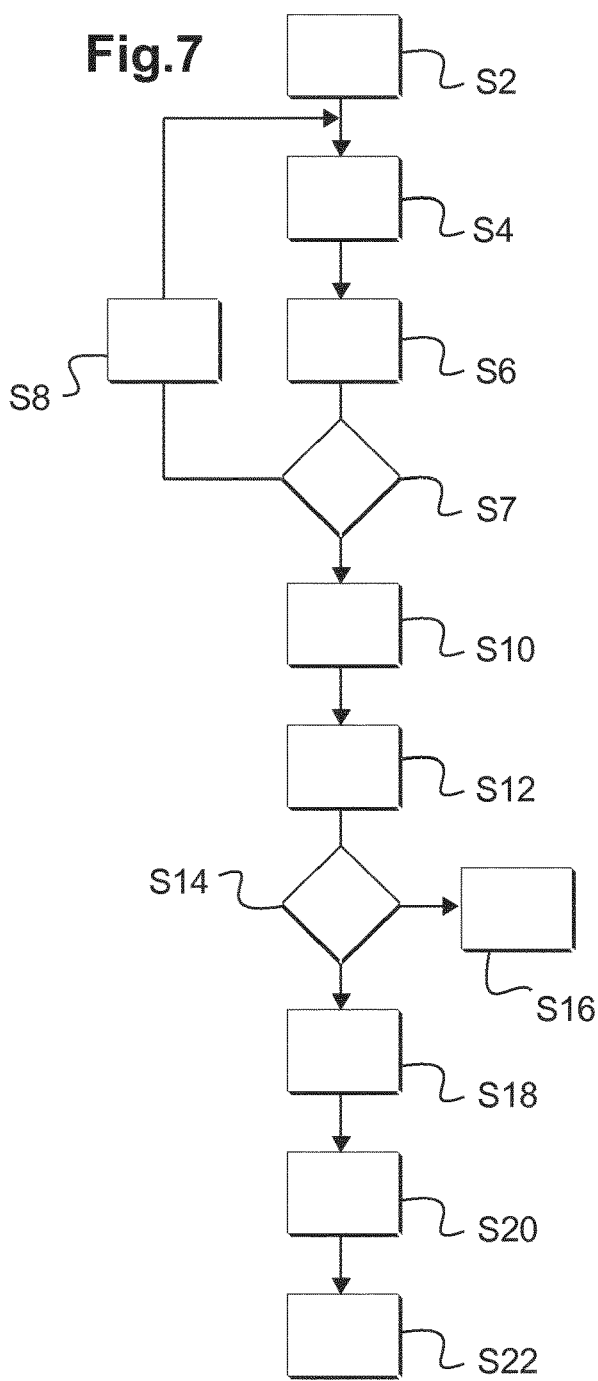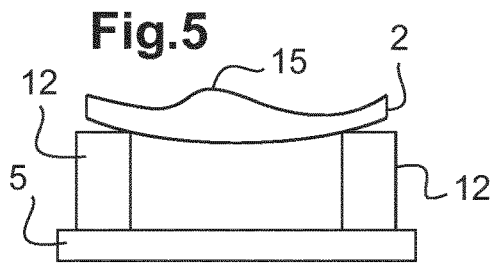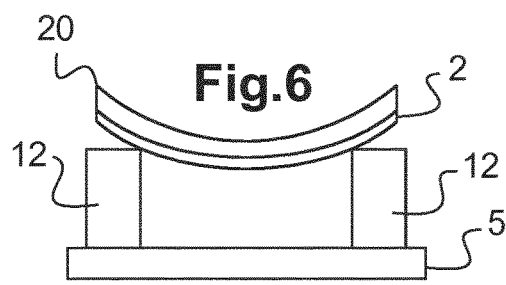

METHOD AND MANUFACTURING SYSTEM FOR MANUFACTURING AN OPHTHALMIC LENS USING AN ADDITIVE MANUFACTURING TECHNOLOGY This application is the U.S. national phase of International Application No. PCT/EP2019/075707 filed Sep. 24, 2019 which designated the U.S. and claims priority to EP Patent Application No. 18306240.5 filed Sep. 25, 2018, the entire contents of each of which are hereby incorporated by reference.

TECHNICAL FIELD OF THE INVENTION

The invention relates to the manufacturing of ophthalmic lenses.

More precisely the invention relates to a method and a manufacturing system for manufacturing an ophthalmic lens using an additive manufacturing technology.

BACKGROUND INFORMATION AND PRIOR ART

Using an additive manufacturing technology to manufacture an ophthalmic lens is of interest because the obtained ophthalmic lens is directly shaped to fit the frame that shall carry the ophthalmic lens and/or the obtained ophthalmic lens complies with the wearer's optical prescription.

The additive manufacturing process needs to be precisely performed. This is the case for example of the build over technology which consists in adding material on an existing optical element in order to manufacture the ophthalmic lens by additive manufacturing. The existing optical element is positioned on a support and a complementary portion is added by additive manufacturing.

However, the existing optical element may undergo some deteriorations, such as distortions or wrapping for example.

SUMMARY OF THE INVENTION

The present invention provides a method for manufacturing an ophthalmic lens using an additive manufacturing technology. The method aims at improving the detection of the position of an optical element before adding a complementary material during a build over operation.

More precisely, the invention consists in a method for manufacturing an ophthalmic lens using an additive manufacturing technology, based on an optical element and initial manufacturing data, said initial manufacturing data comprising data defining a complementary portion to deposit on the optical element to form the ophthalmic lens from the optical element, the method comprising the steps of:
  positioning the optical element on a support,
  determining a positioning error between the position of the optical element and a reference position on said support using a measurement directed to the optical element,
  determining a deterioration on the optical element,
  calculating updated manufacturing data taking into account initial manufacturing data and the determined positioning error, and
  manufacturing the ophthalmic lens using the updated manufacturing data by the additive manufacturing technology by depositing the complementary portion on the optical element to form the ophthalmic lens from the optical element.

Thanks to the invention, a positioning error of the optical element is determined when this optical element is positioned on the support. This positioning error is then taken into account in the manufacturing data. Manufacturing data are thus updated and the location of the position of the optical material on which material will be added is recalculated according to this positioning error. The complementary material is then added at the recalculated position on the optical element. The build over operation thus takes place at the right position on the optical element and is thus efficient.

Other advantageous features of the method are the following ones:
  the positioning error corresponds to a translation error or a rotational error in the positioning of the optical element relative to the reference position on the support;
  the optical element comprises a reference mark on a side;
  the step of determining a positioning error comprises a step of comparing the position of the reference mark of the optical element to an expected position of the reference mark of the reference position on said support;
  the method also comprises a step of correcting the positioning of the optical element on the support;
  said step of determining a deterioration comprises a step of determining a deterioration parameter,
  the updated manufacturing data is updated taking into account said deterioration parameter;
  the step of determining a deterioration comprises a step of measuring a thickness of the optical element;
  updated manufacturing data take into account initial manufacturing data, the positioning error and the thickness of the optical element;
  the step of determining a deterioration comprises a step of measuring an optical power of the optical element;
  the step of determining a deterioration comprises a step of measuring a curvature of the optical element;
  the method also comprises steps of:
  comparing the thickness of the optical element to a first threshold, and
  if the thickness of the optical element is lower than the first threshold, depositing an initial complementary portion on the optical element, the initial complementary portion has a thickness adapted to compensate for the difference of thickness between said thickness of the optical element and the first threshold;
  the method also comprises steps of:
  comparing the thickness of the optical element to a second threshold, and
  if the thickness of the optical element is higher than the second threshold, removing the optical element from the support.

The invention also comprises a manufacturing system for manufacturing an ophthalmic lens, based on an optical element and initial manufacturing data, said initial manufacturing data comprising data defining a complementary portion to deposit on the optical element to form the ophthalmic lens from the optical element, the manufacturing system comprising:
  a support designed to bear the optical element at a given position,
  a measurement unit designed to determine a positioning error between the given position of the optical element and a reference position on said support using a measurement directed to the optical element,
  a calculating unit adapted to calculate updated manufacturing data taking into account initial manufacturing data and the determined positioning error, and a manufacturing unit designed to detect a deterioration on the optical element and to manufacture the ophthalmic lens using the updated manufacturing data by the additive manufacturing technology by depositing the complementary portion on the optical element to form the ophthalmic lens from the optical element.

DETAILED DESCRIPTION OF EXAMPLE(S)

The following description, given with regard to the appended drawings, which are given by way of non-limiting examples, will allow what the invention consists of and how it can be carried out to be understood.

In the appended drawings:

FIG. 1 shows an exemplary manufacturing system adapted to manufacture an ophthalmic lens according to the invention;

FIG. 2 shows an exemplary support of the manufacturing system according to the invention;

FIG. 3 shows a first exemplary positioning of an optical element in a cavity of the support;

FIG. 4 shows a second exemplary positioning of an optical element in a cavity of the support;

FIG. 5 shows a third exemplary positioning of an optical element in a cavity of the support;

FIG. 6 shows an exemplary ophthalmic lens manufactured on the support by adding a complementary portion on the optical element according to the invention; and FIG. 7 shows an exemplary flowchart corresponding to a method for manufacturing an ophthalmic lens according to the invention.

FIG. 1 shows a manufacturing system 1 adapted to manufacture an ophthalmic lens.

The manufacturing system 1 comprises a device 3 and a support 5. The device 3 is suitable for manufacturing the ophthalmic lens using an additive manufacturing technology. The expression "additive manufacturing technology" refers to processes that manufacture solid objects by juxtaposing volume elements or voxels. In the case of the present invention, the ophthalmic lens is thus manufactured by adding volume element by volume element, layer by layer on an optical element 2. The additive manufacturing technology may be in practice stereolithography (SLA) or polymer jetting.

The device 3 comprises a control unit (not shown in FIG. 1). This control unit includes a microprocessor and a memory. The memory stores instructions that allow the manufacturing system 1 to implement a method for manufacturing the ophthalmic lens as described below when these instructions are executed by the microprocessor. In particular, the memory stores initial manufacturing data. Initial manufacturing data comprise data characterising the optical element 2. Initial manufacturing data also comprise data defining a complementary portion 20 to deposit on the optical element 2 to form the ophthalmic lens from the optical element 2.

The optical element 2 is obtained before the implementation of the method according to the present invention. As an example, the optical element 2 can be obtained by being manufactured by different methods such as moulding or additive manufacturing.

The optical element 2 is the base element for manufacturing the ophthalmic lens. The optical element 2 is a part of the final ophthalmic lens and is thus designed to have some properties required for defining the ophthalmic lens. As an example, the optical element 2 is transparent. However, the optical element 2 may not be fully configured with all the attributes needed to be compatible with the requested prescription of a wearer or may not be shaped with the final lens outline desired for mounting it in a frame.

As an example, the optical element 2 can include a blank lens which is designed and made of materials suitable for ophthalmic lenses but which is not in a final form for a wearer use. The blank lens thus needs to be further shaped or modified to produce a prescription optical power, to produce a non-prescription lens or to fit it within an eyewear frame.

As another example, the optical element 2 can be an old lens previously used by the wearer and which should be adjusted to a new prescription or a new frame.

The support 5 shown in FIG. 1 is designed to sustain the optical element 2 during the manufacturing process described below. The support 5 is designed to bear the optical element 2 at a given position for manufacturing the ophthalmic lens. As represented in FIG. 2, the support 5 can comprise a plurality of cavities 10 adapted to receive the optical element 2. As an example, a cavity 10 can be formed by a blocking ring 12. The blocking ring 12 is designed to support the optical element 2 during the build over operation.

As an alternative, the blocking ring 12 can be replaced by a maintaining element consisting in three bearing points (this maintaining element being also adapted to sustain the optical element 2 during the manufacturing process).

The shape and dimensions of the cavities 10 and of the blocking rings 12 are here determined considering the features of the optical element 2 and the features of the ophthalmic lens being manufactured. These features include the shape of the manufactured ophthalmic lens (concave or convex) and/or the shape and dimensions of a frame in which the ophthalmic lens will be mounted.

The manufacturing system 1 also comprises an assembly of units (not represented), such as a measurement unit, a calculating unit and a manufacturing unit. These units are in practice made with a combination of hardware elements and software elements. Each unit implements a function described in the method according to the invention and explained below. For each unit, the manufacturing system 1 stores for example software instructions that can be implemented by the microprocessor in order to use a material element and thus execute the function associated to the concerned unit.

The manufacturing system 1 shown in FIG. 1 and described previously is suitable to execute a method for manufacturing an ophthalmic lens using the additive manufacturing technology. FIG. 7 shows an exemplary flowchart corresponding to a method for manufacturing an ophthalmic lens according to the invention.

This method comprises a step S2 of positioning the optical element 2 on one of the blocking rings 12 (and in one of the cavities 10) available on the support 5. During this step S2 of positioning, the exact position and/or orientation of the optical element 2 on the blocking ring 12 are not known.

However, the complementary portion 20 needs to be added precisely on the optical element 2 in order to manufacture the desired ophthalmic lens. In other words, the complementary portion 20 is expected to be added at a specific location on the optical element 2.

The measurement unit of the manufacturing system 1 is designed to evaluate the position of the optical element 2 on the support 5. The measurement unit comprises for example a camera to evaluate the position of the optical element 2 on the support 5. A reference position is also identified on the support 5.

In the present embodiment, the optical element 2 also comprises a reference mark P on a face of the optical element 2. As visible in FIG. 3, the optical element 2 comprises a back face 13 and a front face 14. The reference mark P is for example engraved on the surface of one of the faces of the optical element 2. The reference mark P is for example engraved on the back face 13 of the optical element 2.

At a step S4, the measurement unit is thus adapted to detect and compare the reference mark P on one of the faces of the optical element 2 and the reference position identified on the support 5. If the optical element 2 is well positioned on the support 5, the reference mark P and an expected position of this reference mark of the reference position should match.

Therefore, at this step S4, the measurement unit is adapted to determine a positioning error between the position of the optical element 2 and the reference position on the support 5. In practice, the measurement unit is adapted to compare the position of the reference mark of the optical element 2 to the expected position of this reference mark of the reference position on the support 5 to deduce the positioning error.

This positioning error may comprise a translation and/or a rotational error in the positioning of the optical element 2 relative to the reference position on the support 5. In practice, the positioning error usually comprises a combination of a translation error and a rotational error in the positioning of the optical element 2 on the support 5.

The positioning error is determined using a measurement directed to the optical element 2 and conducted by the measurement unit (such as the camera comprised in the measurement unit).

As an alternative, the measurement unit may use for example a three-dimensional scan or a palpation scanning device.

Using the positioning error determined by the measurement unit, the manufacturing system 1 is adapted to calculate, at a step S6, updated manufacturing data. The updated manufacturing data is calculated, by the calculating unit, taking into account initial manufacturing data and the determined positioning error. In practice, the intended position of the complementary portion 20 in the initial manufacturing data is corrected in translation and/or rotation to take into account the determined positioning error. For example, the updated manufacturing data comprises a new position of the complementary portion 20, this new position being obtained using an opposite value in translation and/or rotation compared to the position of the optical element 2.

The next steps, described below, of the method for manufacturing the ophthalmic lens are thus adapted using the updated manufacturing data.

FIG. 3 shows an exemplary positioning of the optical element 2 in a cavity 10 of the support 5. The reference mark P is identified on the optical element 2. According to the reference position on the support 5 (not explicitly represented), the reference mark P should intersect a vertical line L represented in FIG. 3. This vertical line L is for example deduced from the reference position. As shown in FIG. 3, the optical element 2 is not well positioned on the support 5 to deposit the complementary portion 20 and manufacture the ophthalmic lens.

As represented in FIG. 7, the method described here also comprises a step S7 in which the positioning error is compared to a predetermined value. The predetermined value corresponds for example to the maximum positioning error allowed to continue the process and manufacture the ophthalmic lens. In other words, this step S7 is for example implemented in the method to check that the positioning error is not too important before executed the next steps (described below).

If the positioning error is higher than the predetermined value, the method may also comprise a step S8 of correcting the positioning of the optical element 2 on the support 5. This step is implemented to reduce the positioning error and to cancel it if possible. This step is for example executed when the updated manufacturing data recorded that the positioning error is too important to complete the manufacturing of the ophthalmic lens.

FIG. 4 shows a second exemplary positioning of the optical element 2 in a cavity 10 of the support 5. In this example, the optical element 2 is correctly positioned on the support 5: the reference mark P of the optical element 2 intersects the vertical line L meaning that the reference mark P and its expected position on the reference position match.

When the step S8 is implemented, the positioning error can be evaluated again (loop to the step S4 in FIG. 7) to confirm that the new position of the optical element 2 is satisfactory to continue the process.

If the positioning error is lower than the predetermined value, the method for manufacturing the ophthalmic lens then continues executing a step S10 of determining a deterioration on the optical element 2. The measurement unit is designed to detect the deterioration on the optical element 2.

This step S10 of determining a deterioration comprises a step of determining a deterioration parameter. The deterioration parameter is for example the thickness, an optical power or a curvature of the optical element 2 as described below.

The deterioration is for example a defect located on the optical element 2 and for example due to a distortion. This step of determining the deterioration comprises a step of measuring a thickness of the optical element 2. As an alternative, this step of determining a deterioration can comprise a step of measuring an optical power or a curvature of the optical element 2 as described below.

The updated manufacturing data is then updated taking also into account the deterioration parameter, e. g. the thickness of the optical element 2 (step S12).

As visible in FIG. 7, the method according to the invention comprises a step S14 in which the thickness of the optical element 2 is compared to a second threshold.

If the thickness of the optical element 2 is higher than the second threshold, the optical element 2 is considered to be deformed. FIG. 5 shows a third exemplary positioning of the optical element 2 in the cavity 10 of the support 5. As visible in this Figure, the optical element 2 comprises an overhang part 15. This overhang part 15 could be due to a deformation undergone by the optical element 2.

In this case, the optical element 2 cannot be used to manufacture the ophthalmic lens. The deformed optical element 2 is thus removed form the support 5 without deposing the complementary portion 20 on it at a step S16.

If the thickness of the optical element 2 is lower than the second threshold, the method continues at a step S18. At this step S18, in order to manufacture the ophthalmic lens, the thickness of the optical element 2 is compared to a first threshold. The first threshold corresponds for example to the expected thickness to form the ophthalmic lens. The first threshold is for example calculated from specific features of the ophthalmic lens to be manufactured such as the edge width or the diameter of the ophthalmic lens.

If the thickness of the optical element 2 is lower than the first threshold, the method comprises a step S20 of depositing an initial complementary portion on the optical element 2. In this case, the thickness expected for the ophthalmic lens is not reached.

Therefore, the deposited initial complementary portion has a thickness adapted to compensate for the difference of thickness between a measured thickness of the optical element 2 and the expected thickness.

This step S20 of manufacturing the ophthalmic lens is based on the updated manufacturing data which also account for the expected thickness of the optical element 2.

Finally, the method comprises a step S22 of manufacturing the ophthalmic lens. The ophthalmic lens is obtained combining the optical element 2 and the initial complementary portion with the complementary portion 20.

During this step S22, the complementary portion 20 is deposited on the combination formed by the optical element 2 and the initial complementary portion voxel by voxel by the manufacturing system 1 according to the updated manufacturing data. The updated manufacturing data comprise in particular the quantity and position of material to deposit on the optical element 2 to satisfy for example the prescription of a wearer.

Finally, the ophthalmic lens is formed by adding the complementary portion 20 on the optical element 2 by the additive manufacturing technology included in the manufacturing unit of the manufacturing system 1.

FIG. 6 shows an exemplary ophthalmic lens manufactured on the support 5 by adding the complementary portion 20 on the optical element 2. As visible in FIG. 6, the thickness of the manufactured ophthalmic lens is lower in the middle of the ophthalmic lens than in the edges. This variable thickness corresponds to the prescription or the desired features of the wearer.

As previously introduced, the deterioration can be an optical power defect or a curvature defect. The measurement unit can thus be designed to evaluate the optical power or the curvature of the optical element using suitable methods such as deflectometry or surface curvature measurement.

In this alternative, the updated manufacturing data is then updated taking into account the measured optical power or curvature. These values can be compared to the expected ones (for the ophthalmic lens to manufacture) and the updated manufacturing data can then be calculated in order to compensate possible optical power defects or curvature defects. The complementary portion is finally deposited on the optical element compensating optical power or curvature defects. The ophthalmic lens is obtained with the target optical power and curvature.

The invention claimed is:

1. Method for manufacturing an ophthalmic lens using an additive manufacturing technology, based on an optical element and initial manufacturing data, said initial manufacturing data comprising data defining a complementary portion to deposit on the optical element to form the ophthalmic lens from the optical element, the method comprising the steps of:
    positioning the optical element on a support,
    determining a positioning error between the position of the optical element and a reference position on said support using a measurement directed to the optical element,
    determining a deterioration on the optical element, said step of determining a deterioration comprising a step of measuring an optical power of the optical element,
    calculating updated manufacturing data taking into account said initial manufacturing data, the measured optical power and the determined positioning error, and
    manufacturing the ophthalmic lens using the updated manufacturing data by the additive manufacturing technology by depositing the complementary portion on the optical element to form the ophthalmic lens from the optical element.

2. The method for manufacturing an ophthalmic lens according to claim 1, wherein the positioning error corresponds to a translation error or a rotational error in the positioning of the optical element relative to the reference position on the support.

3. The method for manufacturing an ophthalmic lens according to claim 2, wherein the optical element comprises a reference mark on a side.

4. The method for manufacturing an ophthalmic lens according to claim 2, also comprising a step of correcting the positioning of the optical element on the support.

5. The method for manufacturing an ophthalmic lens according to claim 2, wherein said step of determining the deterioration comprises a step of determining a deterioration parameter, the updated manufacturing data being updated taking into account said deterioration parameter.

6. The method for manufacturing an ophthalmic lens according to claim 1, wherein the optical element comprises a reference mark on a side.

7. The method for manufacturing an ophthalmic lens according to claim 6, wherein the step of determining the positioning error comprises a step of comparing the position of the reference mark of the optical element to an expected position of the reference mark of the reference position on said support.

8. The method for manufacturing an ophthalmic lens according to claim 7, also comprising a step of correcting the positioning of the optical element on the support.

9. The method for manufacturing an ophthalmic lens according to claim 7, wherein said step of determining the deterioration comprises a step of determining a deterioration parameter, the updated manufacturing data being updated taking into account said deterioration parameter.

10. The method for manufacturing an ophthalmic lens according to claim 6, also comprising a step of correcting the positioning of the optical element on the support.

11. The method for manufacturing an ophthalmic lens according to claim 6, wherein said step of determining the deterioration comprises a step of determining a deterioration parameter, the updated manufacturing data being updated taking into account said deterioration parameter.

12. The method for manufacturing an ophthalmic lens according to claim 1, also comprising a step of correcting the positioning of the optical element on the support.

13. The method for manufacturing an ophthalmic lens according to claim 1, wherein said step of determining the deterioration comprises a step of determining a deterioration parameter, the updated manufacturing data being updated taking into account said deterioration parameter.

14. The method for manufacturing an ophthalmic lens according to claim 1, wherein said step of determining the deterioration comprises a step of measuring a thickness of the optical element.

15. The method for manufacturing an ophthalmic lens according to claim 14, wherein the step of calculating updated manufacturing data takes into account said initial manufacturing data, the measured optical power, the positioning error and the thickness of the optical element.

16. The method for manufacturing an ophthalmic lens according to claim 14, also comprises steps of:
comparing the thickness of the optical element to a threshold, and
if the thickness of the optical element is lower than the threshold, depositing an initial complementary portion on the optical element, the initial complementary portion has a thickness adapted to compensate for the difference of thickness between said thickness of the optical element and the threshold.

17. The method for manufacturing an ophthalmic lens according to claim 14, also comprises steps of:
comparing the thickness of the optical element to a threshold, and
if the thickness of the optical element is higher than the threshold, removing the optical element from the support.

18. The method for manufacturing an ophthalmic lens according to claim 1, wherein said step of determining a deterioration comprises a step of measuring a curvature of the optical element.

19. Manufacturing system for manufacturing an ophthalmic lens, based on an optical element and initial manufacturing data, said initial manufacturing data comprising data defining a complementary portion to deposit on the optical element to form the ophthalmic lens from the optical element, the manufacturing system comprising:
a support designed to bear the optical element at a given position,
a measurement unit designed to determine a positioning error between the given position of the optical element and a reference position on said support using a measurement directed to the optical element, the measurement unit being designed to evaluate an optical power of the optical element,
a calculating unit adapted to calculate updated manufacturing data taking into account said initial manufacturing data, the evaluated optical power and the determined positioning error, and
a manufacturing unit designed to manufacture the ophthalmic lens using the updated manufacturing data by an additive manufacturing technology by depositing the complementary portion on the optical element to form the ophthalmic lens from the optical element.

* * * * *